UNITED STATES PATENT OFFICE.

HENRI DE CHASSELOUP-LAUBAT, OF PÉRIGUEUX, FRANCE.

COMPOSITION FOR DESTROYING THE GRAPE OIDIUM.

SPECIFICATION forming part of Letters Patent No. 297,354, dated April 22, 1884.

Application filed January 22, 1884. (No specimens.) Patented in France May 22, 1883, No. 155,595.

*To all whom it may concern:*

Be it known that I, HENRI DE CHASSELOUP-LAUBAT, a citizen of the Republic of France, residing at Périgueux, Department of Dordogne, France, have invented a new and useful Composition of Matter to be Used for the Destruction of the Oidium, of which the following is a specification.

My composition consists of the following ingredients, combined in the proportions stated, viz: pure water, nine hundred and sixty ounces; pentasulphuret of potassium, twenty-five ounces; marine salt, fifteen ounces; total, one thousand ounces. These ingredients are to be thoroughly mingled by agitation.

In using the above-named composition I sprinkle it over the grapes affected with the oidium by means of a pulverizing or dispersing apparatus of any known construction. The oidium, growing exuberantly on the grapes, dies soon away, and the next falling rain will wash it off, leaving the grapes entirely clean.

What I claim, and desire to secure by Letters Patent of the United States, is—

The herein-described composition of matter to be used for destroying the oidium on the grapes, consisting of water, pentasulphuret of potassium, and marine salt, in the proportions specified.

In testimony whereof I have signed this specification in the presence of two subscribing witnesses.

HENRI DE CHASSELOUP-LAUBAT.

Witnesses:
GUSTAVE A. DITTMAR,
EDWIN AGOSTINI.